Figure 1:
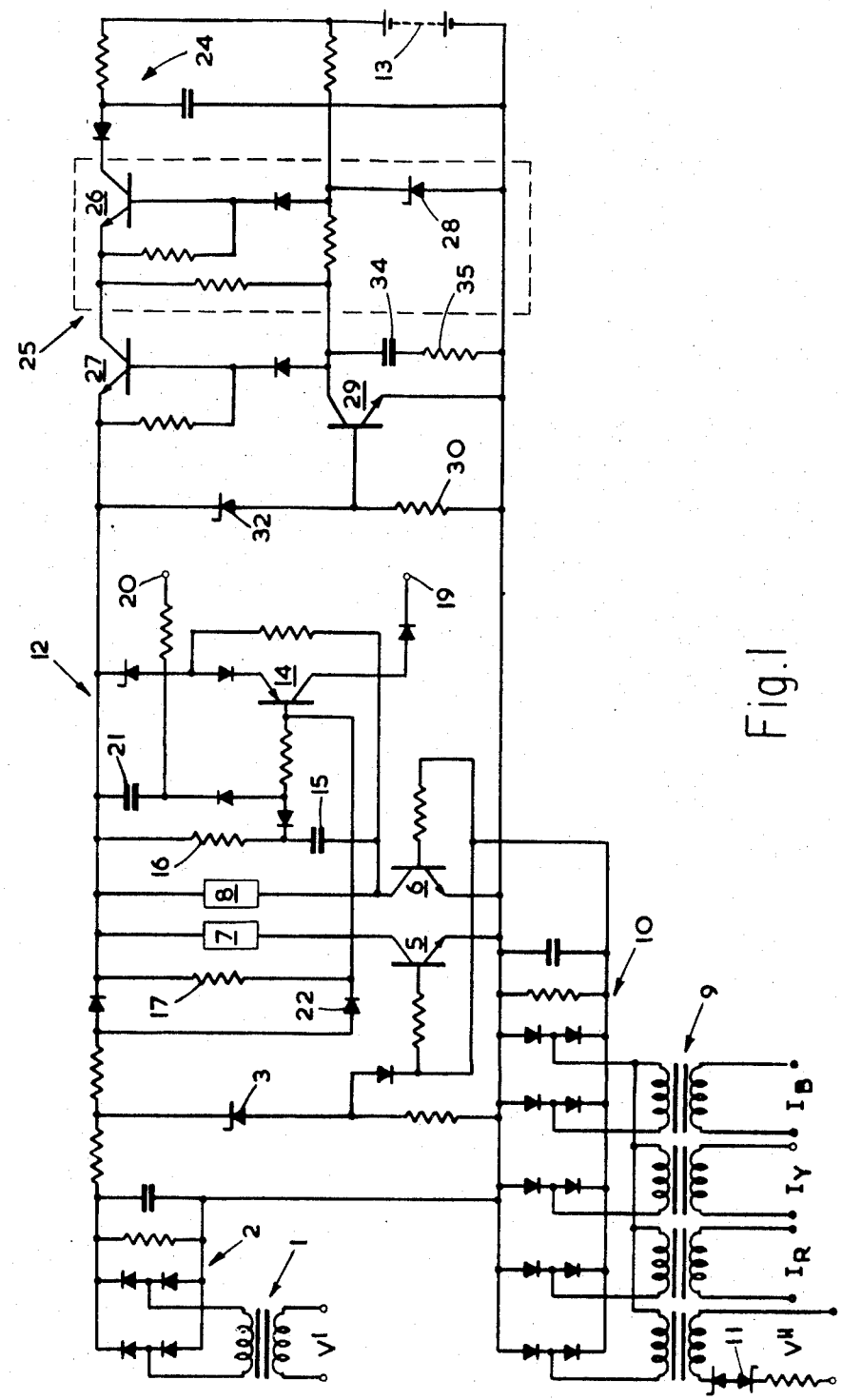

United States Patent

[11] 3,629,657

[72] Inventors Eric Paddison;
Michael Charles Stephen Simpson, both of Stafford, England
[21] Appl. No. 12,330
[22] Filed Feb. 18, 1970
[45] Patented Dec. 21, 1971
[73] Assignee The English Electric Company Limited
London, England
[32] Priority Feb. 18, 1969
[33] Great Britain
[31] 8,642/69

[54] DC ASSISTED POWER SUPPLY
6 Claims, 2 Drawing Figs.

[52] U.S. Cl. .................................................. 317/33 R,
307/48, 317/36 TD
[51] Int. Cl. ........................................................ H01h 47/18,
H02j 7/34
[50] Field of Search ............................................ 307/44, 48;
317/33 R, 36 TD

[56] References Cited
UNITED STATES PATENTS
3,267,288 8/1966 Maiden et al. ................. 307/48 X
3,308,306 3/1967 Bagno ............................ 307/48 X

*Primary Examiner*—James D. Trammell
*Attorneys*—Misegades & Douglas, Keith Misegades and George R. Douglas, Jr.

ABSTRACT: This invention relates to monitoring circuits for monitoring power transmission systems, and is concerned with providing DC energization for them. A protection scheme for a transmission system normally has a "station" battery of high voltage and capacity for operating the main circuit breakers. The voltage on this may change violently, e.g. by 50 percent, and it must also be protected from even quite small continuous discharges. The monitoring circuit is normally powered from the transmission system by the signals which it monitors, but this power is sometimes insufficient. By this invention, the "station" battery 13 is used to keep the monitoring circuit 12 continuously powered, being connected to the monitoring circuit via a voltage regulator 25-32 which is set to be cutoff in normal conditions.

3,629,657

DC ASSISTED POWER SUPPLY

This invention relates to monitoring circuits for monitoring power transmission systems, and in particular to arrangements for providing DC energization of such monitoring circuits.

Such monitoring circuits may be used, for example, to detect faults occurring in the system being monitored and to initiate protective action such as opening circuit breakers. The conditions in the system are detected via voltage and current transformers of well-known type which, although the power in the system may be great, are only able to supply very low power. It is usual for the monitoring circuit to be normally energized by the power available from, e.g., the voltage transformer coupled to the transmission system. When the system is healthy, a relatively low power is required, but when a fault occurs a relatively high power may be required for a brief period.

In transmission system protection scheme, there is normally a "station" battery of high voltage and high capacity which is used to provide the high power required to energize the main circuit breakers in the transmission system. Because of the heavy load which the station battery may have to feed, its voltage is therefore liable to undergo large variations, e.g., a drop of 50 percent from the normal 125 or 250 v. is not uncommon. Furthermore, although this battery is of high capacity, it nevertheless has to be protected from being discharged by a continuous discharge, since even though the power drawn by any one such discharge might be very low, a number in combination can exceed the desirable limit determined by the independent charger. For these reasons, therefore, it has not hitherto been found practicable to use the station battery for energizing the monitoring circuit except with severe limitations.

It has been known to use an independent battery in each monitoring circuit, in addition to the "station" battery, this independent battery being connected so as to be normally charged by the power available from the transmission system. The independent battery provides the extra power needed when the power available from the transmission system is reduced or the power required by the monitoring circuit is increased. However, this solution is not fully satisfactory, because of battery aging, performance range, maintenance requirements, etc.

According to the present invention there is provided a monitoring circuit for monitoring a power transmission system, arranged to be energized from the transmission system in normal conditions, and including a voltage regulator connectable to a "station" battery and set to be cutoff in normal conditions but to turn on to maintain the monitoring circuit energized if the power available from the transmission system becomes insufficient.

Preferably the monitoring circuit includes switching means, controlled by the input signals, which isolate the main monitoring circuitry from the power supply when these signals are all below a preset level. This will only happen when the transmission system is dead, and since it serves no purpose to keep the monitoring system energized at such a time, turning it off then helps to diminish the drain on the battery.

The regulator may be a transistor regulator with a series transistor connecting the battery to the main power rail in the monitoring circuit, and a control transistor responsive to the voltage on the main power rail to control the series transistor. A zener diode may be used to determine the voltage at which the series transistor is cutoff.

A safety circuit may also be included, which cooperates with a timer to cause immediate circuit breaking if a fault is detected on initial energization of the transmission system. This ensures that there is no delay in breaking the circuit if, for example, earthing clamps have been left on the transmission system after servicing.

Figure 2:
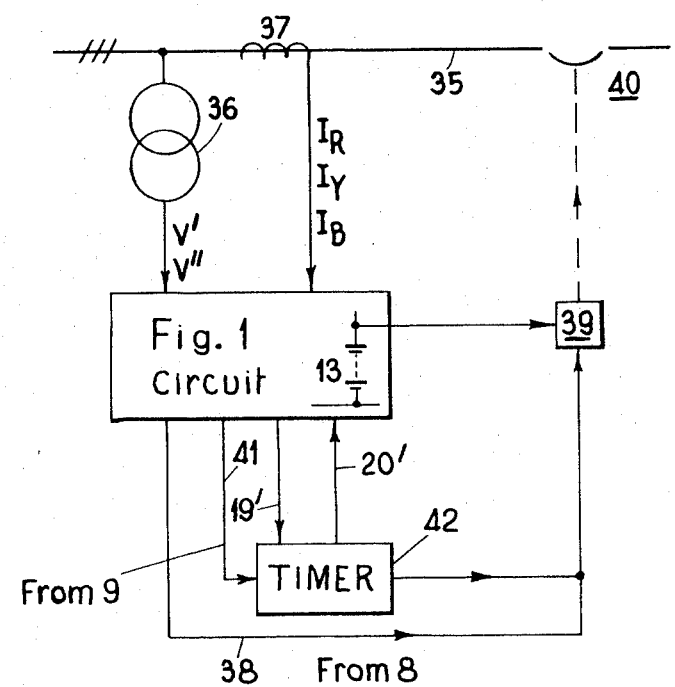

In order that the invention may be fully understood, one embodiment thereof will be described, by way of example, with reference to the accompanying drawings, in which FIG. 1 is a schematic diagram of a battery-assisted power supply circuit is a distance relay, and FIG. 2 is a simplified general diagram of a protective relay station.

In this circuit, the voltage V' of one phase in the protected line (not shown) is monitored, applied to a transformer 1 and rectified and smoothed by a circuit 2. This voltage input supplies power to the remainder of the circuit and, if its value exceeds the breakdown level of a zener diode 3 (about 80 percent of the normal value to be expected) actuates transistor switches 5, 6 having as their collector loads the measuring circuits 7 and the other supervisory circuits 8 of the relay, respectively. The three-phase currents, $I_R$, $I_Y$, $I_B$ are separately monitored in a similar manner, applied to transformers 9 are rectified and smoothed by a circuit 10. The voltage V" from another phase is also applied to this circuit provided its value exceeds the breakdown level of zener diodes 11, this provision being of particular utility since the transistor switches 5 and 6 are thereby maintained conductive during the dead time in a single-phase auto-reclose sequence in which this circuit may be used.

The output from the circuit 10 is operative to turn the transistor switches 5, 6 on to energize the circuits 7, 8; it performs only this switching function, unlike the output from the circuit 2 which, as mentioned, supplies the operating power and only effects the switching function when a predetermined level has been exceeded. The 80 percent level for the circuit 2 is set so as to avoid a voltage induced into an isolated phase from an adjacent live phase turning on transistor switches 5 and 6 before V' has reached a sufficient level to maintain the normal load current of circuits 7 and 8. This avoids any undesirable drain on the "standby" supply from the relay station battery (described below).

A safety circuit 12 is provided for decreasing the operating time of the relay at the time of being switched on if there is a fault lying at or very close to the relying point, so that the protective breaker may be actuated substantially instantaneously. Such a fault may be caused by earthing clamps being left of the line. In this instance the voltage presented to the relay by the circuit 2 will be very low and the standby supply from the station battery will provide power to the safety circuit. This safety circuit includes a transistor 14 which is conditioned for conduction only for the period during which a capacitor 15 charges up through a resistor 16 upon turn on, this transistor subsequently being held in its nonconducting state is response to the base voltage, applied via resistor 17, rising above its emitter potential as the capacitor reaches a certain level of charge. Output terminal 19 is connected to a relay circuit (not shown) which is operative during a fault, and if a closeup fault is present during the charging period, then the output at 19 causes the relay circuit to operate the circuit breaker substantially instantaneously, instead of after a time delay. A "holding" circuit is completed via output terminal 20 as soon as the relay circuit has operated, so that the emitter-base junction of transistor 14 is maintained forward-biased, this holding current flowing as soon as capacitor 21 has charged to its appropriate potential. This capacitor 21 thus prevents the holding function from being initiated by spurious signals.

Further, a diode 22 is provided to inhibit the action of the safety circuit at normal voltage levels of the circuit 2 by immediately reverse-biasing the emitter-base junction of transistor 14, whereas with low-voltage levels, as is the case with closeup faults, the voltage on the anode of this diode is lower than that on the emitter of transistor 14 provided by the battery so that the circuit is allowed to operate in its normal manner.

Referring to FIG. 2, the transmission line 35 has voltage and current transformers 36 and 37 coupled to it to provide the signals V', V", $I_R$, $I_Y$, and $I_B$ which are fed to the circuit shown in FIG. 1. Certain of these signals are also fed to the monitoring circuits 8 and 9 of FIG. 1, which detect faults lying within predetermined sections of the line 35, the section monitored by circuit 8, say, being longer than the section monitored by circuit 9 and extending backwards of the monitoring station as well as forwards along the line. Detection of a fault by the fault 8 generates a signal on line 38 which is fed to an operating coil 39 which opens circuit breaker contacts 40. If a fault is detected only be circuit 9, a signal is generated on line 41 and fed to the coil 39 via a timer 42, which introduces a predetermined time delay. Thus if the fault is within the primary protected zone of another relay station, that relay station will operate before the time delay expires. The terminals 19 and 20 of the circuit of FIG. 1 are connected to the timer 42 via lines 19′ and 20′; a pulse on line 19′ causes the timer 42 to produce its output immediately, without the usual time delay, and a signal is fed back over line 20′ to the FIG. 1 circuit to extend the pulse on line 19′. Thus for a closeup zero voltage fault, to which circuit 8 does not respond, the system will operate immediately when first switched on instead of with the time delay of timer 42.

As mentioned above, the station battery 13 provides a standby supply, that is, it provides the extra power necessary to trip the output relays in the event of a line fault occurring, since the input transformers are designed only to accommodate the relatively low-power consumption required by the measuring circuits, etc., under normal conditions and cannot provide the high power periodically required on isolating faults. In addition the battery can supply the power necessary to operate all the relay circuitry 7, 8 etc. in the event of a failure in the supply derived from the monitored line quantities.

To achieve this, the battery 13 is connected through a low-pass RC filter 24 to a rectangular 25 comprising two identical transistors 26, 27 having their emitter-collector paths connected in series with one another, the base of transistor 26 being held at the breakdown voltage of a zener diode 28 so as to ensure that the emitter of this transistor, and thus the collector of transistor 27, never rises above this level. A further transistor 29, having a base resistor 30, is also provided. This regulator is operative in response to a level detector comprising a zener diode 32 coupled between the positive supply line and the junction between the transistor 29 and its resistor 30.

In the operation of this circuit, under normal conditions transistor 29 is held in its conducting state since the zener voltage of the diode 32 is exceeded; consequently, transistors 26, 27 are held substantially nonconducting. Should the normal supply now be overloaded as a result of the burden imposed by the loads 7 and 8 in responding to a line fault, then the supply voltage will drop causing transistor 29 to cease conducting whereupon transistors 26, 27 conduct and connect the battery supply in circuit with the load, raising the voltage towards its nominal value again. At this point transistor 29 starts to conduct again, turning off the series transistors. An equilibrium state is achieved in which the current through resistor 30 is just sufficient to turn on the transistor 29 to an extent such as to enable transistors 26, 27 to conduct sufficiently to supplement the power deficiency.

Thus, current is only drawn from the station battery 13 when the power supply provided from the line itself cannot meet the internal load, and further, only sufficient current is drawn from the battery to meet the demand. Under normal operating conditions only a negligible current is drawn by the transistor 29.

As a precaution against oscillation and damage to the series transistors 26, 27 caused by a rapid rate of rise of current through them, a capacitor 34 and a resistor 35 are connected across the collector and emitter of transistor 29. Thus, if transistor 29 is turned off instantaneously its collector potential rises more slowly by virtue of the current necessary to charge capacitor 34, thereby decreasing the rate of rise of base current in the series transistor 27. The delay in the rise of the output current is negligible as far as normal use is concerned.

For a lower range of battery voltage, the circuit shown within the dotted box may conveniently be omitted, it being only necessary for the higher range of battery voltage where this voltage, together with any added transient voltage, might cause the voltage rating of transistor 27 to be exceeded.

Although the invention has been fully described with reference to one particular embodiment, it is to be understood that various modifications may readily be made without departing from the scope of this invention. For example, single-series transistors 26, 27 have been shown in the regulator 25 but in practice these may each comprise a number of transistors connected in cascade to provide a high gain, ensuring that the ratio of maximum load current to standing bias current is high enough to make the latter (drawn continuously by transistor 29) negligible.

We claim:

1. A monitoring circuit for monitoring a power transmission system, arranged to be arranged from the transmission system is normal conditions, and including a voltage regulator connectable to a "station" battery and set to be cutoff in normal conditions but to turn on to maintain the monitoring circuit energized if the power available from the transmission system becomes insufficient, the regulator including a series transistor for connecting the battery to a main power rail in the monitoring circuit, and controlled to keep the voltage on the main power rail constant when conductive.

2. A monitoring circuit according to claim 1, wherein the regulator further includes a control transistor responsive to the voltage on the main power rail to control the series transistor.

3. A monitoring circuit according to claim 2, wherein a zener diode is connected between the main power rail and the base of the control transistor to determine the voltage at which the series transistor is cutoff.

4. A monitoring circuit according to claim 1, including switching means controlled by the signals from the transmission system being monitored to isolate the major part of the monitoring circuit from the power supply when all these signals are below predetermined levels.

5. A monitoring circuit according to claim 1, including a safety circuit which provides a pulse, on the monitoring circuit first being energized, to a timer circuit which is energized in response to a rapidly operating fault detector, the timer circuit normally operating with a time delay but responding to this pulse without delay, to operate a circuit breaker of the transmission system, whereby a fault detected on initial energization of the monitoring circuit causes immediate corrective action.

6. A monitoring circuit according to claim 5, wherein the timer circuit, when operated, feeds a signal back to the safety circuit to maintain said pulse until the fault has cleared.

* * * * *